May 21, 1957     M. L. BARRETT, JR     2,792,705
APPARATUS FOR PROVING POSITIVE-DISPLACEMENT METERS
Filed Aug. 15, 1955     4 Sheets-Sheet 1
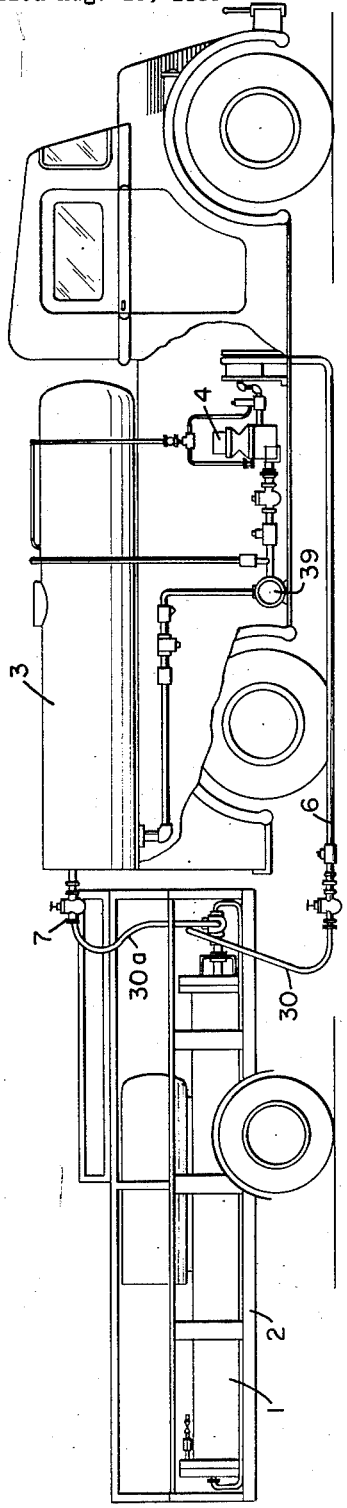
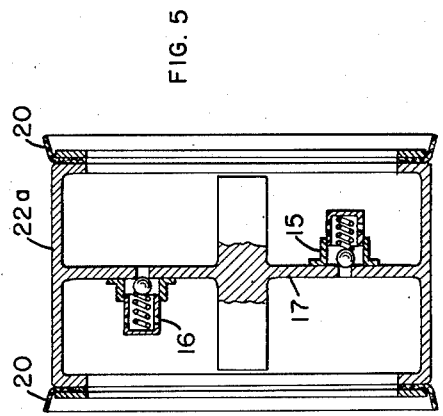
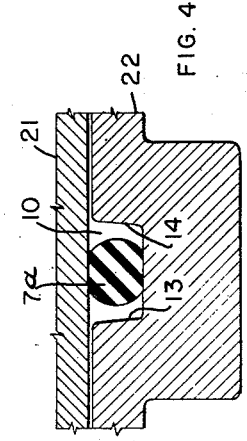
INVENTOR
M. L. BARRETT JR.
BY *J. H. McCarthy*
HIS AGENT

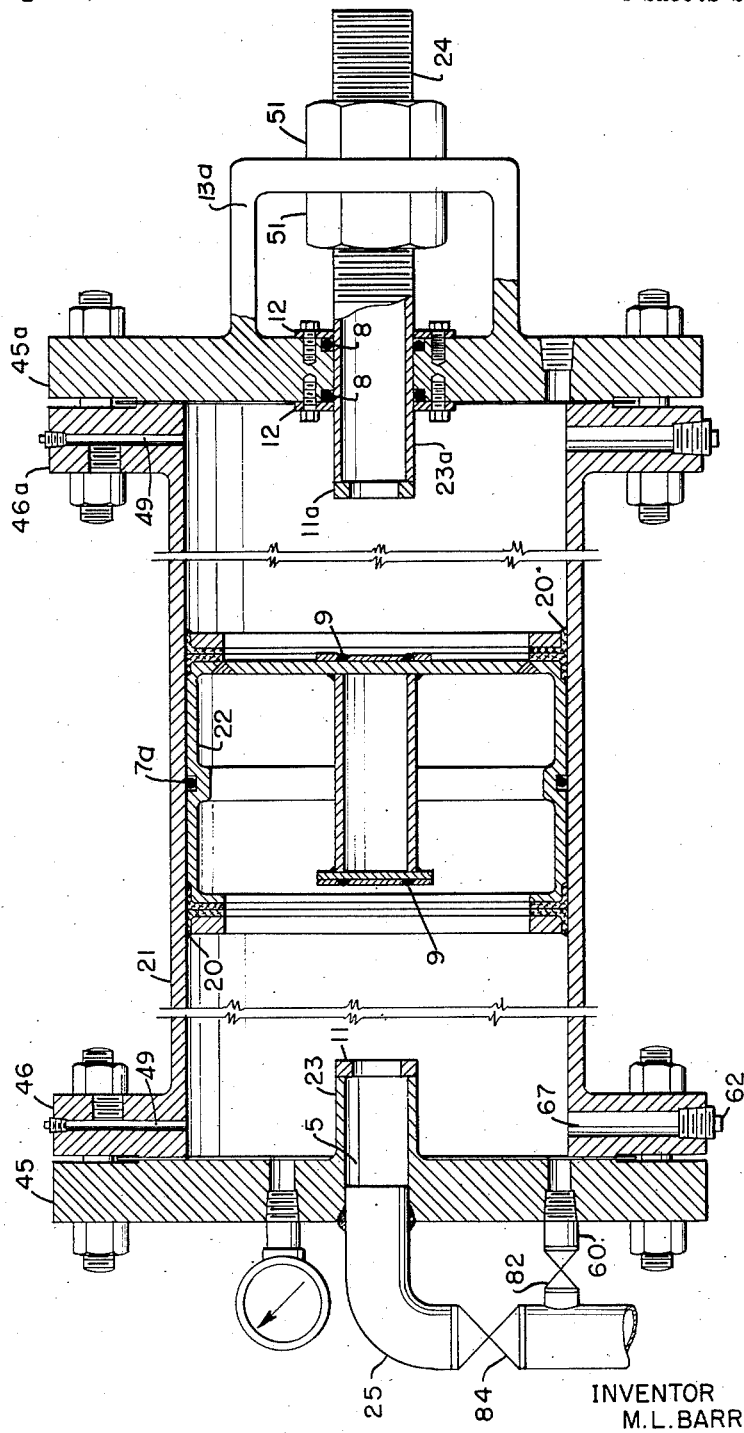

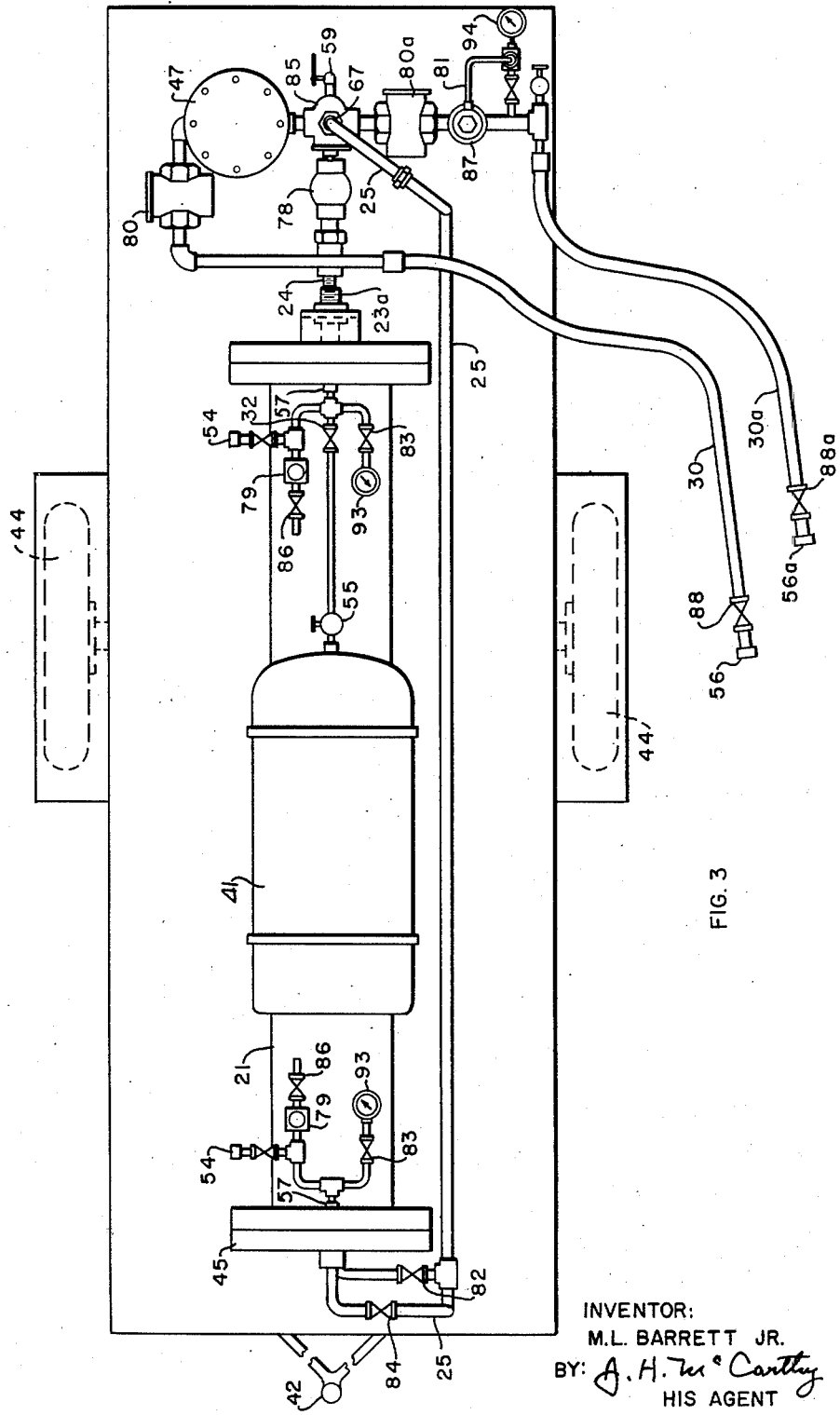

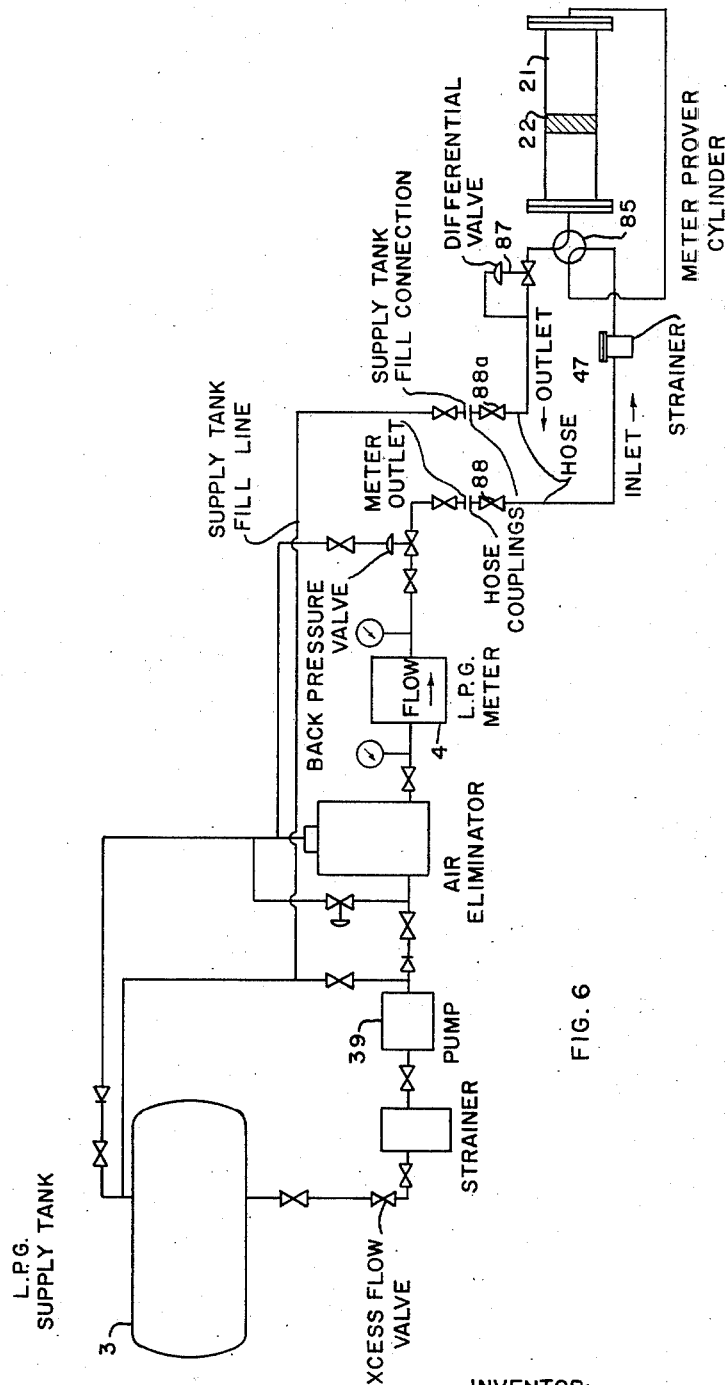

United States Patent Office 2,792,705
Patented May 21, 1957

2,792,705
APPARATUS FOR PROVING POSITIVE-DISPLACEMENT METERS

Maurice L. Barrett, Jr., Babylon, N. Y., assignor to Shell Development Company, New York, N. Y., a corporation of Delaware Application August 15, 1955, Serial No. 528,247

9 Claims. (Cl. 73—3)

This invention relates to a method and apparatus for testing flow meters and pertains more particularly to an apparatus for testing liquid flow meters of the positive-displacement type used in measuring liquids of a corrosive nature, a costly nature, and more particularly liquids having extremely high vapor pressures and high volatility. It is especially applicable and useful in the proving of meters measuring liquefied petroleum gases, anhydrous ammonia, liquefied commercial gases, etc.

Among the objects achieved in this invention are: (1) the provision of equipment for proving meters, said meter prover equipment being designed to prevent errors in the determination of performance characteristic of a meter resulting from evaporation of the liquid used to prove the meter, from air, gas or vapors being entrained in the liquid used to prove the meter, from volumetric changes due to temperature variations, from error or inadequacy of the determination of the density of the test liquid, from effects on the test results arising from rate of flow changes during the course of the proof, from any change in measured quantities of the test liquid resulting from a change from its liquid phase to its vapor phase or vice versa, or from loss of liquid; and (2) the provision of a meter test method avoiding deterioration of the test liquid; and (3) the provision of a meter testing method obviating the necessity of the use, in connection with the process, of a miscible or immiscible liquid to separate, isolate or confine the test liquid; and (4) the provision of a meter testing apparatus readily portable and mobile from one location to another over the public highways, simple in operation, inexpensive to construct and capable of producing test results of the highest order of accuracy in the proving of positive-displacement meters.

In the past, positive-displacement meters have been proved by the use of one of several methods and pertinent apparatus. Probably the most used of these methods is broadly described as the "volumetric method," wherein a quantity of the liquid being measured by the meter under proof is directed through the meter and thence into a precalibrated vessel or prover tank, where the delivered quantity is gauged. This gauged quantity is compared with the quantity indicated as passed by the meter register to determine the performance of the meter in some term expressing the meter's "over" or "under" delivery error.

The "volumetric method" broadly covers three variations of procedure enumerated as follows:

(a) *Straight volumetric method* which utilizes a pressure vessel equipped with reduced area (Seraphin type) top and bottom necks with gauge glasses and employing a vapor return or equalizing conduit between the top of the prover vessel and the top of the liquid supply tank.

(b) *Calculated volumetric method* which utilizes a pressure or prover vessel, as in the above method but with a volume greater than the test draft of liquid, to be used instead of the vapor equalizing line. The prover vessel is caused to contain saturated vapor prior to each test run, and this vapor is condensed as the test run proceeds. This variation requires the use of tables showing the liquid/vapor ratio vs. temperature for the test liquid.

(c) *Hydrostatic method* which utilizes a pressure vessel of known volume without a vapor equalizing line or pressure vessel with a volume in excess of the test draft of liquid to be used. The prover or pressure vessel is caused to contain saturated vapor by filling and emptying it with liquid. Prior to each test, the vapor pressure in the prover tank is reduced to 10 p. s. i. g. by venting to atmosphere. Liquid is then run through the meter until the prover vessel is completely full of liquid, at which time flow stops.

Another frequently used method is the "gravimetric method," wherein the quantity of liquid delivered by the meter being proved, as in the previous method (1), is weighed by some means and such weight compared with the quantity (in similar units of measurement) indicated as passed by the meter register.

The "gravimetric method" broadly covers three variations of procedure enumerated as follows:

(d) Where the specific gravity of the test liquid is determined at low pressure and low temperature using the Dry Ice method.

(e) Where the specific gravity of the test liquid is determined at atmospheric temperature using the high pressure hydrometer method.

(f) Where the net weight and temperature of liquid in a one-gallon calibrated standard measure is obtained using a sensitive scale and thermometer.

A somewhat less frequently used method is broadly described as the "master-meter method," wherein the quantity of liquid delivered by the meter under proof is passed simultaneously through a second meter whose performance has been previously determined by another method. The performance of the meter under proof is obtained by a comparison of the two meter registers.

A method broadly described as the "water displacement method," wherein the quantity of liquid delivered by the meter being proved is passed into a precalibrated vessel containing a second immiscible and heavier liquid, usually water, and wherein this immiscible and denser liquid is displaced from the vessel under pressure in excess of the vapor pressure of the liquid delivered by the meter. The delivered quantity, as determined by the meniscus separating the two liquids, is gauged; and this quantity is compared with the quantity indicated as passed by the meter register to determine the performance of the meter. This method is disclosed in U. S. Patent No. 2,050,800.

Each of the above-described primary methods of calibrating positive-displacement meters has some inherent disadvantage contributing to inaccuracies in the final test results of meters used to meter liquids having vapor pressures higher than atmospheric.

Thus, when the above-described straight and calculated volumetric methods are applied to the proving of meters operating on either liquefied petroleum gases, high vapor pressure petroleum liquids or liquefied commercial gases, the principle source of error arises from the fact that it is difficult in the field to determine the amount of liquid in the vapor occupying the prover vessel at the start of a meter test run and at the end of a test run, and to adjust the observed liquid volume to the net liquid volume delivered to the prover through the meter. When using the hydrostatic method, there is the possibility that the prover may not fill 100% full, particularly during hot weather.

Meters tested by the gravimetric method of meter proving are subject to errors to the extent of the inability of the operator to determine the true density of the test liquid because of the inadequacies and difficulties of such density determinations in field operations. The master meter method of meter proving has the inherent disadvantage of not being able to prove accurately the master meter for any of the reasons listed immediately above. Since the proof of the meter can be no more accurate than the proof of the master meter itself, the disadvantages of the procedure are the same as those described immediately above.

In the water displacement method of testing meters, there are certain inherent advantages; yet at the same time there are the disadvantages of handling water or aqueous solutions of various kinds in winter weather, of the availability of water at the site of the testing, of the formation of an emulsion between the two immiscible liquids and of the lack of portability of such testing apparatus.

The principal objects of this invention are listed as follows:

To provide apparatus for testing positive-displacement flow meters, wherein the test liquid is not permitted to pass from its liquid phase to its vapor phase at any point in the metering or testing operation.

To provide apparatus for testing positive-displacement flow meters which does not necessitate a laboratory or field determination of the density (or weight per gallon) of the test liquid.

To provide apparatus for testing positive-displacement flow meters which does not require manual or visual determination of the test draft or volume passed through the meter being proved, but rather, relies upon a positive mechanical determination of such a fixed test draft, thereby eliminating the possibility of human errors.

To provide apparatus for proving positive-displacement flow meters which eliminates evaporation of the test liquid used to test the meters at all times while the test liquid is passing to or is within the prover vessel thus eliminating the errors resulting therefrom.

To provide apparatus for testing positive-displacement flow meters which operates as an entirely closed system at pressures in excess of the vapor pressure of the test liquid, thus preventing the entrainment of air or vapor in the test liquid.

To provide apparatus for testing positive-displacement flow meters wherein ambient temperature effects on the test draft liquid between the point of metering and point of gauging the delivered volume is minimized.

To provide apparatus for testing positive-displacement flow meters which assures that the meter is tested at its normal internal operating pressure, which is equal to that which exists in the meter during its otherwise normal and routine measuring operations.

To provide apparatus for testing positive-displacement flow meters which assures that the meter can be tested at the rate of liquid flow at which it is operated in its normal and routine measuring operations.

To provide apparatus for testing positive-displacement flow meters which assures that the meter is tested at a rate of liquid flow which is constant from the beginning to the end of the tests thereby precluding any inaccuracies resulting from flow rate variation during the course of the meter proof.

To provide apparatus for testing positive-displacement flow meters which is rugged, extremely simple of manipulation and operation, safe and portable when constructed as a mobile vehicle.

To provide apparatus for testing positive-displacement flow meters which eliminates the necessity of applying corrections, correction factors or adjustments to the observed meter readings or observed delivered volumes such as corrections for air buoyancy, specific gravity vs. temperature, volume vs. temperature, volume vs. pressure, liquid/vapor ratio vs. temperature and condensation vs. pressure.

To provide apparatus for testing positive-displacement flow meters which does not require special placement in operation, nor special precautions in setting up and leveling for operation and is not affected by ambient weather conditions such as rain, wind, temperature, sun, etc.

To provide apparatus for testing positive-displacement flow meters which is integral and self-sufficient within itself and does not require the use of supplementary equipment such as special scales, high or low pressure hydrometers and thermometers, Dry Ice, separate containers, vessels, bottles, conversion charts, calculators, etc.

To provide apparatus for testing positive-displacement flow meters which does not require auxiliary power, nor a pump for removing the test draft from the containing vessel, does not require difficult or extensive test piping, and which requires a minimum of time and labor to effect a suitable test of the meter operating on any type of liquid product which the meter itself is capable of handling.

These and other objects of this invention will be understood from the following description taken with reference to the attached drawings, wherein:

Figure 1 is a view of the present meter proving apparatus connected to a tank truck for calibrating the meter thereon.

Figure 2 is a longitudinal view, taken in cross section, of the volumetric cylinder and piston of the present meter proving apparatus.

Figure 3 is a plan view of the meter proving apparatus mounted on a small trailer.

Figure 4 is a cross-sectional view of a portion of the pressure equalizing O-ring on the piston.

Figure 5 is a view partly in cross section of an alternate form of a piston.

Figure 6 is a schematic view of a typical installation for calibrating meters used in liquefied petroleum gas service.

In Figure 1 of the drawing, the present meter proving apparatus 1 is shown mounted on a trailer 2 which is positioned adjacent a truck 3 whose meter 4 is to be proved or calibrated.

Referring to Figure 2, a portion of the meter proving apparatus is shown as comprising a honed steel cylinder 21 in which is internally fitted a piston 22 provided with a circumferential O-ring seal 7a and cup-type seals 20 at either end of the piston. Both ends of the cylinder 21 are closed to the atmosphere by flanges 45, 45a, 46 and 46a. In the closure flange 45 at the left end of the drawing, a pipe 23 communicates through the center of the flange from the inside of the cylinder to the outside. The end 11 of this pipe 23 is accurately machined flat with the plane of the machined portion coincidental with and perpendicular to the axis of cylinder 21. In the closure flange 45a at the other end of the cylinder 21, a pipe 23a, 11a, 24 communicates through the flange from the inside of the cylinder 21 to the outside, which pipe is accurately machined flat at 11a with the plane of the machined portion coincidental with and perpendicular to the axis of cylinder 21. This latter pipe, 23a is provided with a sealing means between it and flange 45a to prevent the escape to atmosphere of any liquid within the cylinder, and is provided with a bracket 13a by means of which its position may be adjusted along the cylinder axis within the range of threads provided on the pipe. Suitable sealing means at this point are O-rings 8 which are held in place by circular retainer plates 12.

Referring to Figure 3, a pipe 25 communicates between the central port 5 in flange 45 with one port of a 2-position, 4-way, 4-port selector valve 85. The pipe 23a and 24 from the right end of the cylinder 21 communicates with a second port of the valve 85. The remaining 2 ports of the valve 85 communicate by means of flexible hoses 30 and 30a to valves 88 and 88a and thence to suitable couplings 56 and 56a for attachment to the meter outlet and to fill connection of the vessel containing the liquid of the test draft. The hose line 30 contains a strainer 47 and is connected to the meter outlet hose 6 (Figure 1) while the hose line 30a containing a differential valve 87 is connected to fill connection 7.

Both ends of the cylinder 21 are equipped with an outlet pipe 57 communicating preferably through a passageway 49 (Figure 2) in the flange 45 or 45a with the inside of the cylinder 21 at the highest point and as close to the end of the cylinder as possible with a christmas tree containing pressure gauge 93, sight flow gauge 79, pressure relief valve 54, and the necessary stop valves 86 and 83. The purpose of this christmas tree is to provide: (1) elimination of vapors contained in the cylinder 21 in the initial filling of the cylinder with liquid, (2) a means of indicating the pressure existing inside the cylinder 21 on both sides of the piston, (3) a means of releasing internal pressure within the cylinder which may build up above a certain preset point as determined by the setting of relief valve 54, and (4) a means of evacuating any vapors which may collect in the cylinder from time to time. Such a christmas tree is provided for the safety and protection of each end of the volumetric cylinder.

Referring to Figure 3, adjustability of pipe 23 is made possible through the use of swivel joint pipe coupling 78, while longitudinal motion of the 2-position, 4-way, 4-port valve 85 is provided for by the flexibility of the piping 67 and 25.

Physical protection of the entire prover apparatus may be provided through its encasement in a rigid welded steel body fabricated of suitable channel iron, angle iron, shapes and flat steel mesh. A top cover of suitable design may be installed on the equipment, if desired, in such a manner as to entirely enclose the prover apparatus. The entire prover apparatus, its supporting members and the surrounding body may be supported on automotive type springs and wheels and axle 44. The entire vehicle is preferably provided with a suitable adjustable stanchion and a standard vehicular trailer type hitch 42 to enable suitable connection to a motive vehicle.

Before the apparatus can be used for the precision calibration of positive-displacement meters, it must itself be calibrated, i. e., its displacement must be established at some desired and practical volume, say, 50.00 U. S. gallons. This calibration and establishment of the displacement of the piston is obtained by connecting the inlet hose coupling 56 to a suitable source of water, fuel oil or other stable liquid under pressure. In performing the calibration, the cylinder, hoses, lines, valves, etc. are filled with water or some other nonvolatile liquid and the air completely blown from all parts of the apparatus by means of forcing the liquid through the system under pressure. When the apparatus is free of all air and full of liquid from the source to the discharge valve 88a, the piston 22 (Figure 2) is moved to either end of the cylinder by means of the proper manual operation of the 4-way valve 85. The discharge valve 88a is then made to communicate liquid to a standard test measure, in this case of certified 50-gallon capacity container (not shown), valve 85 is moved through its 90° arc to reverse the direction of liquid flow through the cylinder. The amount of liquid displaced by the piston 22 in its full stroke from one end of the cylinder to the other is caught and contained in the test measure. This operation is repeated a sufficient number of times to insure the operator that repetitive results are being obtained.

The observed quantity displaced by the piston in its travel from one extreme end of the cylinder to the other must be adjusted to conform to the nominal test measure capacity, i. e., in this size prover tank, 50.00 U. S. gallons. Suitable adjustment for this purpose if provided in the apparatus by loosening nuts 51 (Figure 2) and turning conduit 23 in the proper direction and in the proper amount to cause the total displacement of the piston to be equal to the desired quantity as indicated by the volume displaced to the test measure. After the apparatus has been calibrated in a manner similar to that described immediately above, the jam nuts 51 may be tightened and sealed and it may be placed in service for the calibration of positive-displacement meters. In preparation for this, the apparatus should be filled completely full of the type of liquid being measured by meters to be proved, and then vented vapor free.

The piston 22 shown in Figure 2 is only one form of piston which may be used in the present cylinder. A piston in the form of a hollow drum, as illustrated, is light in weight so that it may be readily moved by fluid flow from one end of the cylinder 21 to the other. At the same time the piston is wide enough so as to have substantial bearing area against the sides of the cylinder. Each side of the piston 22 is provided with sealing elements of any suitable type, for example, O-rings 9 positioned in axial alignment with the machined ends 11 and 11a of the pipes 23 and 23a at each end of the cylinder 21, and adapted to seat thereagainst when the piston has moved to the end of its stroke. Thus, an effective seal is formed between the piston 22 and the ends of the discharge conduits 23 and 23a in the cylinder 21. It is realized that the seals 9 could be mounted on the ends 11 and 11a of the pipes 23 and 23a instead of on the piston 22. The movable piston 22 may be of any other suitable form which is provided with suitable seals, such as cup washers 20.

By using discharge lines 23 and 23a that are substantially smaller in diameter than the diameter of the cylinder 21, it is possible to obtain a sharp and accurate cut-off of the amount of liquid being pumped into or discharged from the cylinder 21. An essential feature of the present meter prover apparatus is that it is provided with means for equalizing the pressures on opposite sides of the piston 22 at the ends of its strokes. The normal differential pressure across the piston 22 during movement of the piston along the cylinder 21 is 2 to 3 lbs. p. s. i. However, at the moment the piston O-rings 9 seal against one of the pipes 23 or 23a, the pump 39 which forces liquid into cylinder 21 is still running causing the pressure on the upstream side of the piston 22 to rise 50 pounds or more above the pressure on the other side. Unless pressure equalizing means are provided across the piston, it is practically impossible to move the piston in the opposite direction by pumping a stream of fluid through small diameter line 23.

An enlarged cross-sectional view of the circumferential O-ring 7a on piston 22 of Figure 2 is shown in Figure 4. The groove 10 in which the O-ring 7a is seated is slightly wider than the diameter of the O-ring 7a in position. In its neutral position the O-ring may be positioned as shown in Figure 4, but as the piston 22 is moved to the right by the force of liquid the O-ring rolls and remains in contact with one wall 13 of the groove 10 throughout the stroke of the piston. Since the pressure on the upstream side of the piston 22 and O-ring 7a is greater than that downstream at the end of the piston stroke, the O-ring 7a is moved slightly away from wall 13 of groove 10 and toward wall 14 by the differential pressure. Thus, the slight movement of a movable seal 7a in a wide groove 10 acts as means for equalizing the pressures on opposite sides of the piston 22 so that the piston can be readily moved in the opposite direction by reversing the flow of liquid into the cylinder 21.

In Figure 5 another piston 22a is shown as being provided with sealing cups 20 and a pair of spring-loaded pressure relief valves 15 and 16 which are mounted on the central divider plate 17 of the piston to permit passage of fluid therethrough in opposite directions when the pressure on one side of the piston becomes greater than the value imposed on the valves by their springs. The springs are adjusted to maintain a pressure on the normally closed valves 15 and 16 which is slightly greater than that existing during the normal movement of the piston. Thus, on contact of the piston against the discharge pipe 23, one of the valves 15 or 16 opens to equalize pressure on either side of the piston while no fluid can escape from the cylinder as the piston 22 closes the discharge pipe 23. Although it is preferred that the pressure equalizing means, as described above, be mounted in the movable piston 22, a pair of by-pass lines in communication between opposite ends of the cylinder and each having an oppositely-acting spring-loaded relief valve could be employed for the same purpose.

As shown in Figure 2, the conduit 25 in communication between port 5 in flange 45 and the 4-way valve 85 is provided with a manually-operated valve 84 adapted to be closed when it is desired to wash any sediment in the bottom of the cylinder 21 out conduit 60 through valve 82 and into line 25 to be discharged with the liquid leaving the cylinder. The other end of the cylinder may be provided with a duplicate set of valves 82 and 84 for the same purpose. The cylinder is also preferably provided at each end, adjacent the end flanges 45 and 45a, with a depression or well 67 in which solid particles of sediment may accumulate. The sediment in the well 67 is removed from time to time by removing a drain plug 62.

In Figure 1 a typical hookup is shown for the present apparatus in connection with the proving of positive-displacement meters, such for example as those used to prove a meter measuring liquefied petroleum gas out of a transport truck 3. The object of the proof is to determine the relationship between the amount indicated as passing through the meter 4 by its register and the true amount passing through the meter. To do this, the inlet hose coupling 56 of the apparatus is connected to the metered liquid discharge hose 6 coupling of the truck. The outlet hose coupling 56a of the apparatus is connected to the filler connection 7 of the truck. All valves on these two hoses and lines are opened. The two valves 84 and 84a bypass valve 82 around valve 85 are closed. The two valves 82 on the lines leading from the extreme bottom of the ends of the cylinder are opened to permit the flushing out of any previously collected sediment. A vapor chamber 41 may be provided to receive vapors from the cylinder. The valves 55 and 32 communicating conduit 59 between the vapor chamber 41 and the cylinder 21 are always kept closed during the proving of meters and open during periods when the prover is inactive or being transported from one location to another.

The truck pump 39 (Figure 1) is started and liquid allowed to go through the meter 4 to the prover. This drives the piston 22 (Figure 2) to an end of the cylinder 21, whereupon all liquid flow is completely stopped. The discharged liquid from the other end of the prover cylinder is returned to the truck 3. By changing the 4-way valve 85 to its alternate position, liquid flow is again resumed with the piston 22 moving in the opposite direction. Flow will again be stopped when the piston 22 reaches the end of the cylinder 21. In this manner the 2-position, 4-way, 4-port valve 85 is operated alternately from one position to the other, permitting a complete displacement of the liquid in the cylinder for a sufficient number of times to insure that all elements of the proving apparatus are full of liquid and free of all vapors and that temperature equalization has been established. The vapors can be released from the cylinder through the vapor vent valves 86 with observations being made in sight glasses 79 during these preliminary reversals of the piston to provide assurance that the system is free of vapors.

During these preliminary reversals of the piston, the pressure differential, as indicated by the difference between the pressure readings on gauge 94 and gauge 93 should be adjusted high enough to assure that the liquid entering and leaving the prover is not flashing to its vapor phase. This is done by properly adjusting the spring pressure of differential valve 87 which is provided to create sufficient pressure differential across the valve while observing the inlet and outlet sight glasses 80 and 80a to assure that no vapors are passing during flow of liquid.

The variable differential valve 87 (Figure 3) in the discharge line from the 4-way valve 85 creates sufficient back-pressure on the fluid (for example, propane) in the cylinder 21 to prevent it from flashing into vapor. The tank truck 3 and/or the cylinder 21 (Figure 1) is at a pressure equal to the vapor pressure of propane at the temperature at the time of the test. Pressure from the downstream side of differential valve 87 is brought back to the top of the diaphragm of said valve through a tubing 81. Thus, the outlet pressure of valve 87 is less than the inlet pressure by the amount of force exerted by the adjustable spring on said valve.

When both sides of the cylinder are completely filled with the metered liquid, vapor freed of vapor and equalized temperature conditions have been established by the above preliminary reversals, the apparatus is in condition for the proving of a meter. The two valves 84 are opened and the two valves 82 on the lines leading from the extreme bottom of the ends of the cylinder are closed. In the meter proof the 2-position, 4-way, 4-port 85 is moved to either one of its two positions with the pump 39 (Figure 1) operating and the piston 22 allowed to proceed to the end of the cylinder 21 and stop. At this point the operator reads and records the meter reading. The 2-position, 4-way valve 85 is then moved to its alternate position, thereby reversing the direction of flow through the cylinder, and the piston allowed to move to the opposite end of the cylinder end stop, therein displacing the known and precalibrated volume of liquid from the cylinder. When the piston has come to a stop at this opposite end of the cylinder, the operator again reads and records the meter reading. By subtracting the initial meter reading from the final meter reading, the operator determines the amount indicated by the register as having passed through the meter during the proof. He then can compare this quantity with the known quantity displaced by the piston during that same period of meter operation and can determine the performance of the meter in terms of "over or under registration," "meter accuracy or per cent registration" or "meter factor."

The operator may make as many such proof runs as he desires on the meter being proved simply by alternately reversing the flow through the cylinder by means of the action of valve 85, and by reading the meter after the completion of each full stroke of the piston from one end of the cylinder to the other. This is highly desirable in practical operation of such equipment to enable the determination of several repetitive figures from which a sound average figure may be obtained.

In Figure 6, a typical metering installation for calibrating meters used in liquefied petroleum gas service is shown wherein the loop from valve 88 to valve 88a represents the flow of liquid through the principle components of the present meter-proving apparatus. The rest of the components in the flow diagram are those normally found on tank trucks used in liquefied petroleum gas service.

No limitations are imposed by this invention on the relative linear length or diameter of the cylinder or piston or the volume of liquid which can be displaced by the piston in the cylinder or by a combination of cylinders and their pistons connected in parallel one with the other. This volume of liquid displaced may be established at the discretion of the operator or as dictated by the amount of liquid and the time duration required for the proof of various sizes and capacities of meters. A volume of liquid equivalent to about 1–1½ minutes operation of the meter being proved has been found to be a practical satisfactory volume, although greater or lesser displaced volumes may be found satisfactory. It may be advisable in certain types of installations where there can be temperature changes in the flowing stream between the meter itself and the proving apparatus itself to use accurate thermometers at the meter and in the prover to ascertain such temperature changes as may occur in the flowing stream and thereby enable accurate mathematical adjustment of both indicated volumes to the same base temperature.

It is recognized in this apparatus that there may be other suitable items of equipment or other arrangements of such equipment or other sizes of such equipment which will function essentially to produce the same results as the apparatus as pictured. It is further recognized that two or more cylinders with pistons may be manifolded together in parallel to increase the flow capacity of the combination in order to provide for the proving of meters having higher flow capacities.

From the above description it may be seen that a method and apparatus has been provided whereby positive-displacement flow meters may be readily proved under conditions which are superior to and have advantages greater than previously known methods of proving meters, particularly those of a highly volatile nature or having a relatively high vapor pressure. The apparatus is simple, sturdy, efficient, inexpensive, requiring a minimum of time and labor, and eliminating the necessity for skilled technical personnel in order to effect the proof of a positive-displacement meter.

In calibrating a meter proving apparatus of the present invention it was found to be best calibrated using fuel oil as a test liquid and delivering it into a 50.00-gallon National Bureau of Standards Certified Test Measure. The present prover apparatus is capable of repeatedly and consistently displacing 50,000-gallons (11,550 cu. in.) plus or minus 3 cu. in. in both directions of operation. Changes in the flow rate of liquid through the prover cylinder from approximately 1 to 28 gallons per minute do not affect the displaced volume. Nor is the displaced volume affected by stopping or restarting the flow of liquid during the course of any one cycle (stroke of the piston). The cut-off of flow at the end of each piston stroke is adequately dampened and is positive and complete due to the O-ring seals. In testing propane truck meters the present prover apparatus produces "accuracy curves" for the meters which are typical and smooth with all points on any one curve varying not more than plus or minus 0.10 per cent of a mean curve drawn through the test data. If desired, the volume of the cylinder 21 can be changed at any time by varying the distance which pipe 23a extends into the cylinder. It is realized that the volume of the cylinder may be changed in any other manner well known to the art as by mounting one or more adjustable threaded plugs in either end flange 45 or 45a so that they are screwed into the cylinder 21 and displace some of the volume thereof. It would be necessary, however, that the volume adjustment plugs would not extend into the cylinder far enough to interfere with the proper seating of the piston against the discharge pipes 23 and 23a. The discharge pipes 23 and 23a may be made shorter or longer as desired.

I claim as my invention:

1. Apparatus for calibrating a positive-displacement meter, which apparatus comprises a closed measuring cylinder of predetermined volume, a free piston slidably mounted in said measuring cylinder, first inlet and outlet conduit means in one end of said measuring cylinder, second inlet and outlet conduit means in the other end of said measuring cylinder, valve means in both said inlet and outlet conduit means alternately placing the first and then the second of said inlet conduit means in communication with the discharge of the meter being calibrated, while simultaneously opening the second and then the first of said outlet conduit means, the outlet conduit means at the other end of the cylinder being closed by said piston means at the end of each stroke, pressure equalizing means in communication between the two ends of said measuring cylinder for substantially equalizing the pressure across the piston at the end of each piston stroke prior to movement of the piston in the opposite direction, and differential-pressure valve means in the first and second outlet conduit means from said cylinder for providing a back-pressure on the cylinder to maintain any liquid therein in its liquid phase.

2. Apparatus for calibrating a positive-displacement meter, which apparatus comprises a closed measuring cylinder of predetermined volume, a free piston slidably mounted in said measuring cylinder, first inlet and outlet conduit means in one end of said measuring cylinder, second inlet and outlet conduit means in the other end of said measuring cylinder, a 2-position 4-port 4-way valve connected to both said inlet and outlet conduit means for alternately placing the first and then the second of said inlet conduit means in communication with the discharge of the meter being calibrated, while simultaneously opening the second and then the first of said outlet conduit means, the outlet conduit means at the other end of the cylinder being closed by said piston at the end of each stroke, pressure equalizing means carried by said piston for substantially equalizing the pressure across the piston at the end of each piston stroke prior to movement of the piston in the opposite direction, and differential-pressure valve means in the first and second outlet conduit means from said cylinder for providing a back-pressure on the cylinder to maintain any liquid therein in its liquid phase.

3. Apparatus for calibrating a positive-displacement meter, which apparatus comprises a closed measuring cylinder of predetermined volume, a free piston slidably mounted in said measuring cylinder, a 2-position 4-port 4-way valve, two conduits connecting the ends of said cylinder to separate ports in said valve, a conduit leading to a third port of said valve, whereby liquid to be measured may be supplied to said valve from said meter being calibrated, a conduit leading from the fourth port of said valve for discharging liquid therefrom, the conduit between one end of the cylinder and said valve being closed by said piston at the end of alternate strokes of said piston, pressure equalizing means carried by said piston for substantially equalizing the pressure across the piston at the end of each piston stroke prior to movement of the piston in the opposite direction, and a differential-pressure valve in the discharge conduit from said valve for providing a back-pressure on the cylinder to maintain any liquid therein in its liquid phase.

4. Apparatus for calibrating a positive-displacement meter, which apparatus comprises a closed measuring cylinder of predetermined volume, a free piston slidably mounted in said measuring cylinder, a 2-position 4-port 4-way valve, two conduits connecting the ends of said cylinder to separate ports in said valve, the ends of said conduits projecting into said cylinder and adapted to be alternately contacted and closed by the piston at the end of alternate strokes of said piston, sealing means carried on each side of said piston positioned to register with and seal the projecting ends of said conduits, a conduit leading to a third port of said valve, whereby liquid to be measured may be supplied to said valve from said meter being calibrated, a conduit leading from the fourth port of said valve for discharging liquid therefrom, pressure equalizing means carried by said piston for substantially equalizing the pressure across the piston at the end of each piston stroke prior to movement of the piston in the opposite direction, and a differential-pressure valve in the discharge conduit from said valve for providing a back-pressure on the cylinder to maintain any liquid therein in its liquid phase.

5. The apparatus of claim 3 wherein the pressure-equalizing means on said piston comprises a circumferential groove in the outer surface of said piston for containing an O-ring seal, and an O-ring positioned in said groove, the width of said groove being slightly greater than the diameter of said O-ring thereby permitting axial displacement of said O-ring on said piston to equalize substantially the pressures on opposite sides of said piston.

6. The apparatus of claim 3 wherein the pressure-equalizing means on said piston comprises at least a pair of flow passages through the piston, and a pair of spring-loaded pressure-relief valves closing said flow passages, one of said valves being arranged to open when the pressure on one side of said piston is predetermined value greater than the pressure on the other side of said piston, said valves being oppositely mounted to relieve excess pressures on opposite sides of said piston.

7. The apparatus of claim 3 including volume-adjustment means mounted at one end of said cylinder for accurately adjusting the volume of said cylinder to a predetermined value, said means adjustably extending through one wall of said cylinder in a fluid-tight manner.

8. Apparatus for calibrating a positive-displacement meter in a system for metering highly volatile liquid, said system including a tank containing the highly volatile liquid under pressure, a discharge line from said tank provided with a pump, an air eliminator, a positive-displacement meter and a differential-pressure valve for maintaining a back-pressure on said tank, said apparatus comprising a closed measuring cylinder of predetermined volume, a free piston slidably mounted in said measuring cylinder, a 2-position 4-port 4-way valve, two conduits connecting the ends of said cylinder to separate ports in said valve, a conduit leading to a third port of said valve, whereby liquid to be measured may be supplied to said valve from said meter being calibrated, a conduit leading from the fourth port of said valve for discharging liquid therefrom, the conduit between one end of the cylinder and said valve being closed by said piston at the end of alternate strokes of said piston, pressure-equalizing means carried by said piston for substantially equalizing the pressure across the piston at the end of each piston stroke prior to movement of the piston in the opposite direction, and a differential-pressure valve in the discharge conduit from said valve for providing a back-pressure on the cylinder to maintain any liquid therein in its liquid phase.

9. Apparatus for calibrating a positive-displacement meter in a system for metering highly volatile liquid, said system including a truck-mounted tank containing the highly volatile liquid under pressure, a discharge line from said tank provided with a pump, an air eliminator, a positive-displacement meter and a differential-pressure valve for maintaining a back-pressure on said tank, said apparatus comprising a closed measuring cylinder of predetermined volume, a trailer supporting said cylinder, a free piston slidably mounted in said measuring cylinder, a 2-position 4-port 4-way valve, two conduits connecting the ends of said cylinder to separate ports in said valve, a conduit leading to a third port of said valve, whereby liquid to be measured may be supplied to said valve from said meter being calibrated, a conduit leading from the fourth port of said valve for discharging liquid therefrom, the conduit between one end of the cylinder and said valve being closed by said piston at the end of alternate strokes of said piston, pressure-equalizing means carried by said piston for substantially equalizing the pressure across the piston at the end of each piston stroke prior to movement of the piston in the opposite direction, and a differential pressure valve in the discharge conduit from said valve for providing a back-pressure on the cylinder to maintain any liquid therein in its liquid phase.

References Cited in the file of this patent

UNITED STATES PATENTS

| | | |
|---|---|---|
| 1,894,492 | McGogy | Jan. 17, 1933 |
| 2,032,007 | Fee | Feb. 25, 1936 |
| 2,050,800 | Lane et al. | Aug. 11, 1936 |
| 2,620,960 | Harrington | Dec. 9, 1952 |